(12) United States Patent
Du et al.

(10) Patent No.: US 10,377,037 B2
(45) Date of Patent: Aug. 13, 2019

(54) SPEED REDUCTION DEVICE, JOIN SERVO AND ROBOT

(71) Applicant: UBTECH Robotics Corp., Shenzhen (CN)

(72) Inventors: Xuchao Du, Shenzhen (CN); Wenquan Shu, Shenzhen (CN); Youjun Xiong, Shenzhen (CN)

(73) Assignee: UBTECH Robotics Corp, Shenzhen (CN)

(*) Notice: Subject to any disclaimer, the term of this patent is extended or adjusted under 35 U.S.C. 154(b) by 444 days.

(21) Appl. No.: 15/319,793

(22) PCT Filed: Sep. 6, 2016

(86) PCT No.: PCT/CN2016/098253
§ 371 (c)(1),
(2) Date: Dec. 18, 2016

(87) PCT Pub. No.: WO2018/045495
PCT Pub. Date: Mar. 15, 2018

(65) Prior Publication Data
US 2018/0207796 A1 Jul. 26, 2018

(51) Int. Cl.
*F16H 1/46* (2006.01)
*B25J 9/10* (2006.01)
(Continued)

(52) U.S. Cl.
CPC ............ *B25J 9/102* (2013.01); *B25J 17/00* (2013.01); *F16H 1/46* (2013.01); *F16H 37/041* (2013.01);
(Continued)

(58) Field of Classification Search
CPC . F16H 1/12; F16H 1/203; F16H 1/222; F16H 1/46; F16H 2001/2872; B25J 9/102
See application file for complete search history.

(56) References Cited

U.S. PATENT DOCUMENTS 7,455,335 B2 * 11/2008 Garneau ............. E05B 47/0012
 292/144
9,815,192 B1 * 11/2017 Du ........................... B25J 9/102
(Continued)

OTHER PUBLICATIONS

"List of gear nomenclature"—Wikipedia page, obtained Apr. 29, 2019.*

(Continued)

Primary Examiner — Richard W Ridley
Assistant Examiner — Brian J McGovern

(57) ABSTRACT

The present disclosure provides a speed reduction device, a joint servo and a robot. The speed reduction device includes a driving device, a first stage speed reduction assembly and a second speed reduction assembly. The first speed reduction assembly includes a power gear and a face gear. The second speed reduction assembly includes a sun gear that rotates coaxially with the face gear, a planet gear set driven to rotate by the sun gear, a fixed gear, an output gear for outputting power and a fixed shaft. The speed reduction device uses the first speed reduction assembly and the second speed reduction assembly for power transmission and is compact in structure and has a high single stage transmission ratio.

10 Claims, 9 Drawing Sheets

(51) Int. Cl.
*B25J 17/00* (2006.01)
*F16H 57/08* (2006.01)
*F16H 1/28* (2006.01)
*F16H 57/02* (2012.01)
*F16H 37/04* (2006.01)

(52) U.S. Cl.
CPC .... *F16H 57/082* (2013.01); *F16H 2001/2872* (2013.01); *F16H 2057/02034* (2013.01)

(56) References Cited

U.S. PATENT DOCUMENTS

| | | | | |
|---|---|---|---|---|
| 10,088,044 | B2* | 10/2018 | Yu | B60T 13/746 |
| 2005/0159268 | A1* | 7/2005 | Yan | A47L 9/009 |
| | | | | 475/343 |
| 2006/0191369 | A1* | 8/2006 | Cockerham | B60N 2/0232 |
| | | | | 74/500.5 |
| 2006/0272444 | A1* | 12/2006 | Cockerham | B60N 2/929 |
| | | | | 74/502.6 |
| 2009/0121568 | A1* | 5/2009 | Acosta | F16H 1/203 |
| | | | | 310/77 |
| 2010/0273597 | A1* | 10/2010 | Wilson, Jr. | A62B 1/10 |
| | | | | 475/149 |
| 2012/0077637 | A1* | 3/2012 | Chen | B25J 9/102 |
| | | | | 475/336 |
| 2012/0202641 | A1* | 8/2012 | Sappenfield | A61C 17/26 |
| | | | | 475/337 |
| 2013/0199321 | A1* | 8/2013 | Oberle | F16D 7/021 |
| | | | | 74/89.14 |

OTHER PUBLICATIONS

"Epicyclic gear," Wikipedia page, obtained Jun. 12, 2019, <https://en.wikipedia.org/wiki/Epicyclic_gearing>.*

* cited by examiner

SPEED REDUCTION DEVICE, JOIN SERVO AND ROBOT

BACKGROUND

1. Technical Field

The present invention is directed to the field of robotics, and particularly to a speed reduction device, a joint servo and a robot having the joint servo.

2. Description of Related Art

Robots are the cores of automation of industrial manufacturing. However, certain operations of robots are required to be performed at a low speed, which needs speed reduction devices with high transmission ratio. The transmission of some conventional speed reduction devices is not sufficient. Especially in the joint servo of human shaped intelligent robots, it is required that speed reduction devices have small size, high torque, compact structure and satisfy the requirement of specific speed reduction ratio.

For satisfying the requirement of specific speed reduction ratio, it is usually realized by way of parallel shaft gear transmission that has a low single stage speed reduction ratio and a structure that is not compact. Compared with planet gear transmission having the same gear module, the load bearing capability of parallel shaft gear transmission is inferior to the planet gear transmission. NGW type planet gear transmission can have a compact structure and strong load bearing capability. However, the single transmission ratio of the NGW type planet gear transmission is not very high, usually ranging from 2 to 9, and it needs multiple stage gear transmission to satisfy the requirement of specific speed reduction ratio. The aforementioned two transmission types are usually used in conventional servo speed reduction devices, and realize speed reduction by way of multiple stage combinations (usually 3-4 stages). Using multiple stage gear transmission can result in a high cost. It is difficult for maintaining the consistency of multiple gears during manufacturing, test and assembling, which will cause the key indicators, such as current and noise of servos, to be uncontrollable.

SUMMARY

The present invention is to provide a speed reduction device, and aims to resolve the technical problems that it is difficult to ensure the consistency during manufacturing, test and assembling, arising because the conventional speed reduction devices employ combination of multiple stage transmission structures using multiple gears to realize speed reduction.

The present invention is realized as follows. A speed reduction device includes:

a driving device used to provide power and including an output shaft for outputting power;

a first stage speed reduction assembly used to change an output direction of the power, the first stage speed reduction assembly including a power gear that is mounted on the output shaft and rotates together with the output shaft, and a face gear that engages the power gear, and a rotation direction of the face gear being perpendicular to a rotation direction of the power gear; and a second stage speed reduction assembly securely mounted on a surface of the face gear that has gear teeth, and including a sun gear that rotates coaxially with the face gear, a planet gear set that engages the sun gear and is driven to rotate by the sun gear, a fixed gear that is mutually engaged with the planet gear set and used to restrict idling of the planet gear set, an output gear that is mutually engaged with the planet gear set and outputs the power, and a fixed shaft that passes through the face gear, the sun gear and the planet gear set in sequence and is locked tightly to the output gear.

Further, the planet gear set includes three planet gears that are arranged at an outside of the sun gear and engage the sun gear, a planet carrier that is used to mount the planet gears thereon and is mounted to the fixed shaft. The output gear is arranged around a periphery of the planet gears and engages the planet gears.

Further, the fixed gear includes first inner gear teeth that engage the planet gears. The output gear includes second inner gear teeth that engage the planet gears, and the first inner gear teeth and the second gear teeth are arranged along an axial direction of the planet gears.

Further, the planet carrier includes an upper panel mounted to the fixed shaft, a lower panel fixed to the upper panel and a plurality of planet axles that are securely connected to the planet gears. The upper panel and the lower panel define therebetween a plurality of mounting opening for mounting the planet gears therein. The axles are mounting in the mounting opening and each include an end inserted into the upper panel and an opposite end inserted into the lower panel.

Further, the planet gears each include a first gear and a second gear stacked on each other along an axial direction thereof, and the first gear and the second gear are rotatable with respect to the planet axle corresponding thereto.

Further, the speed reduction device further includes a base defining a first receiving chamber and a side cover securely connected to the base. The side cover and the base define a second receiving chamber. The driving device is mounted within the first receiving chamber, the first stage speed reduction assembly and the second stage speed reduction assembly are mounted within the second receiving chamber and the fixed gear is fixed to the base and the side cover.

Further, the base includes main body defining the first receiving chamber, a support protruding from a bottom of the main body and used to support the face gear. The support defines a fixing hole, and the fixed shaft is inserted into the fixing hole and passes through the face gear.

Further, the base further includes a ring portion that is opposite to the support and arranged around a periphery of the output gear, and a fixing inner side that is arranged between the ring portion and the support and opposite to the side cover for being fixed to the side cover.

The present invention further provides a joint servo including the aforementioned speed reduction devices.

The present invention further provides a robot including the aforementioned joint servo.

Compared with the existing technology, the technical effects of the present invention include: The speed reduction device uses the firsts stage speed reduction assembly and the second stage speed reduction for power transmission, which has a compact structure and a high single transmission ratio. Specifically, it drives the face gear to rotate and realize the change of power transmission direction by way of using the power gear in the first stage speed reduction assembly to engage the face gear, and it drives the output gear to rotate by way of arranging the sun gear to rotate together with the face gear and using the sun gear to drive the planet gear set, thereby realizing power transmission with a compact structure and a small size and less amount of gears, and ensuring the consistency of the servo gears during manufacturing, test and assembling.

BRIEF DESCRIPTION OF THE DRAWINGS

To describe the embodiment(s) of the present invention, the drawings used in the descriptions of the present invention or the existing technology will be briefly introduced. Obviously, the following described drawings are merely some embodiments of the present invention. Other drawings may be obtained based on these drawings by those skilled in the art without creative work.

The description of drawing labels.

Figure 1:
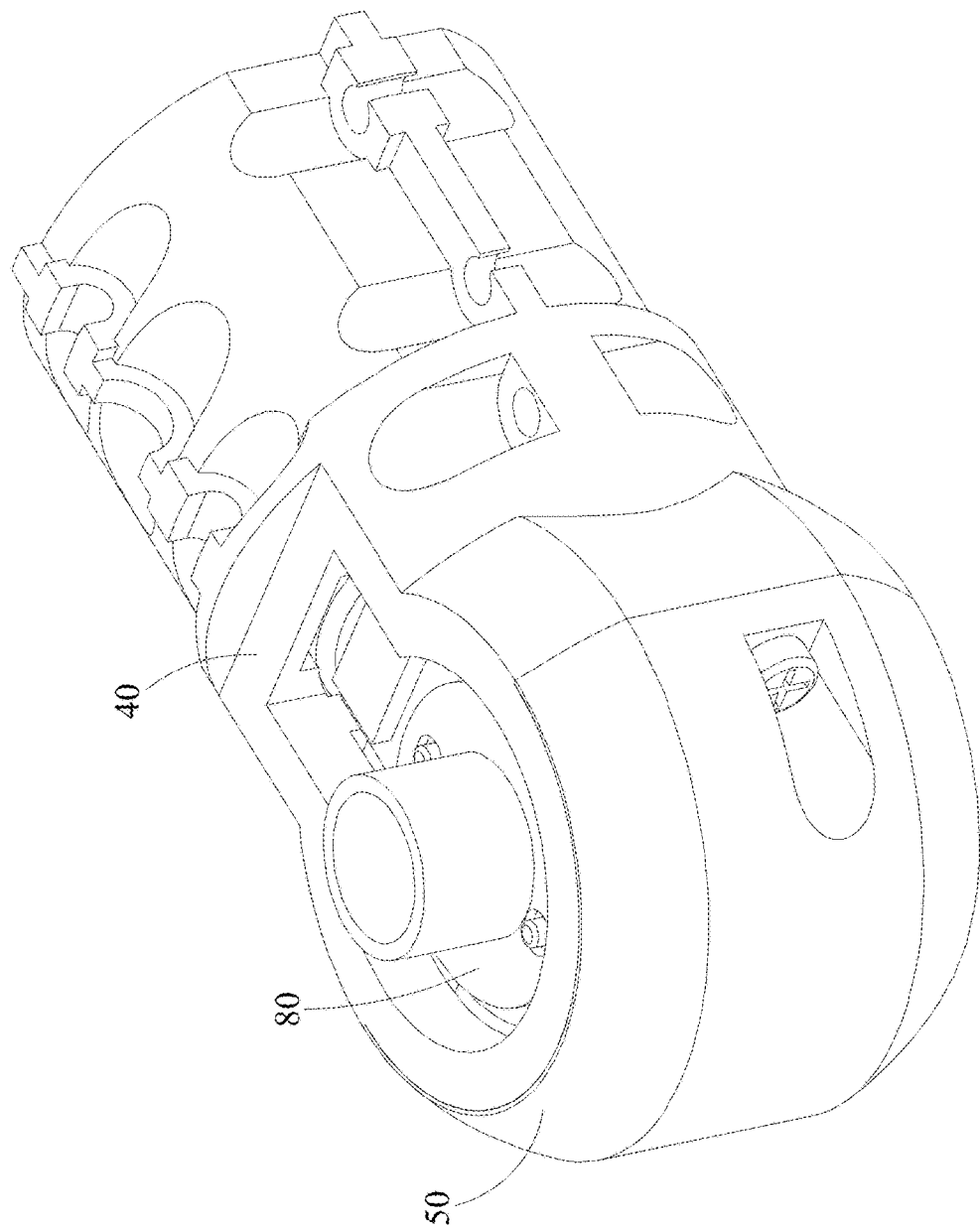
FIG. 1 is a structural view of a speed reduction device according to an embodiment of the present invention.
Figure 2:
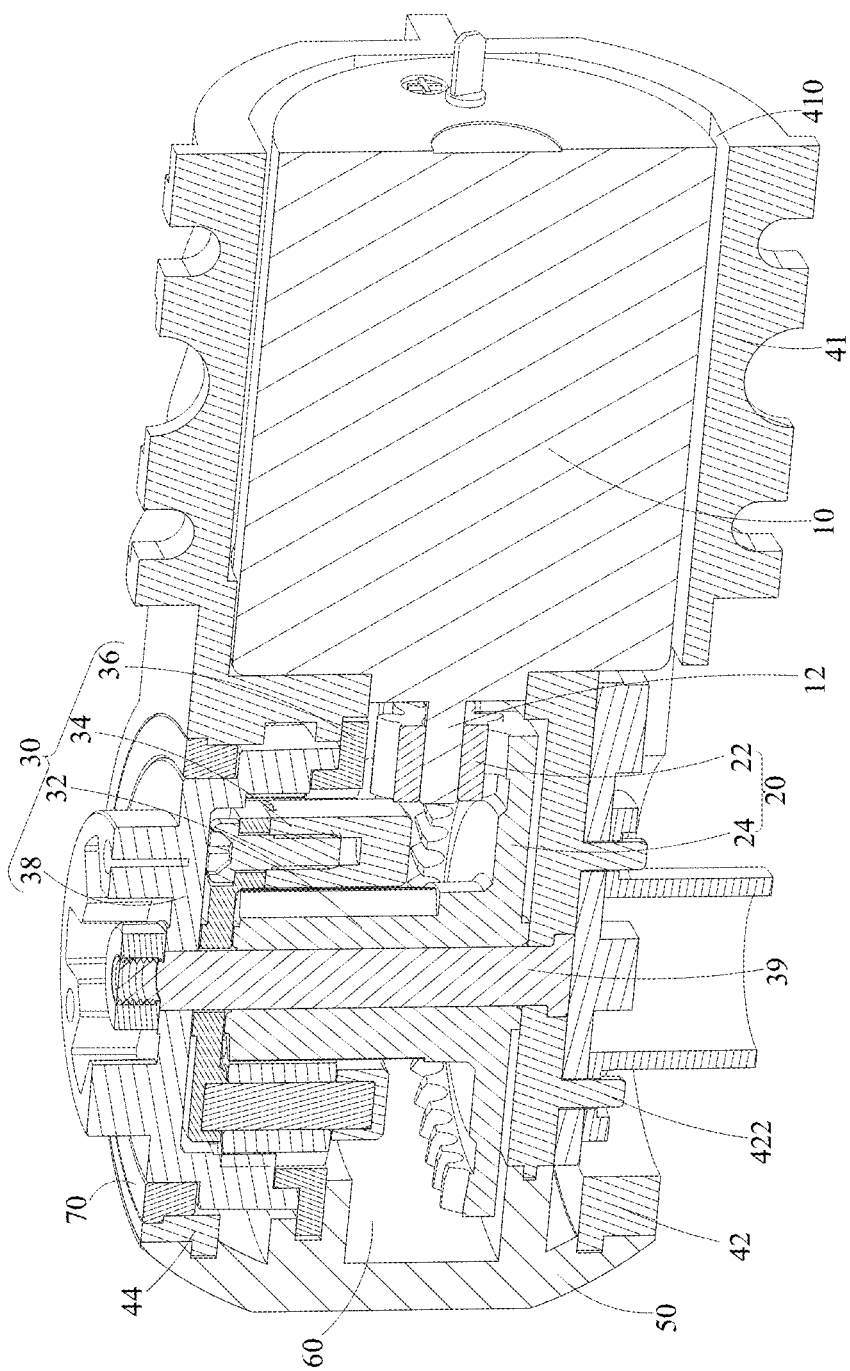
FIG. 2 is a sectional view of the speed reduction device.
Figure 3:
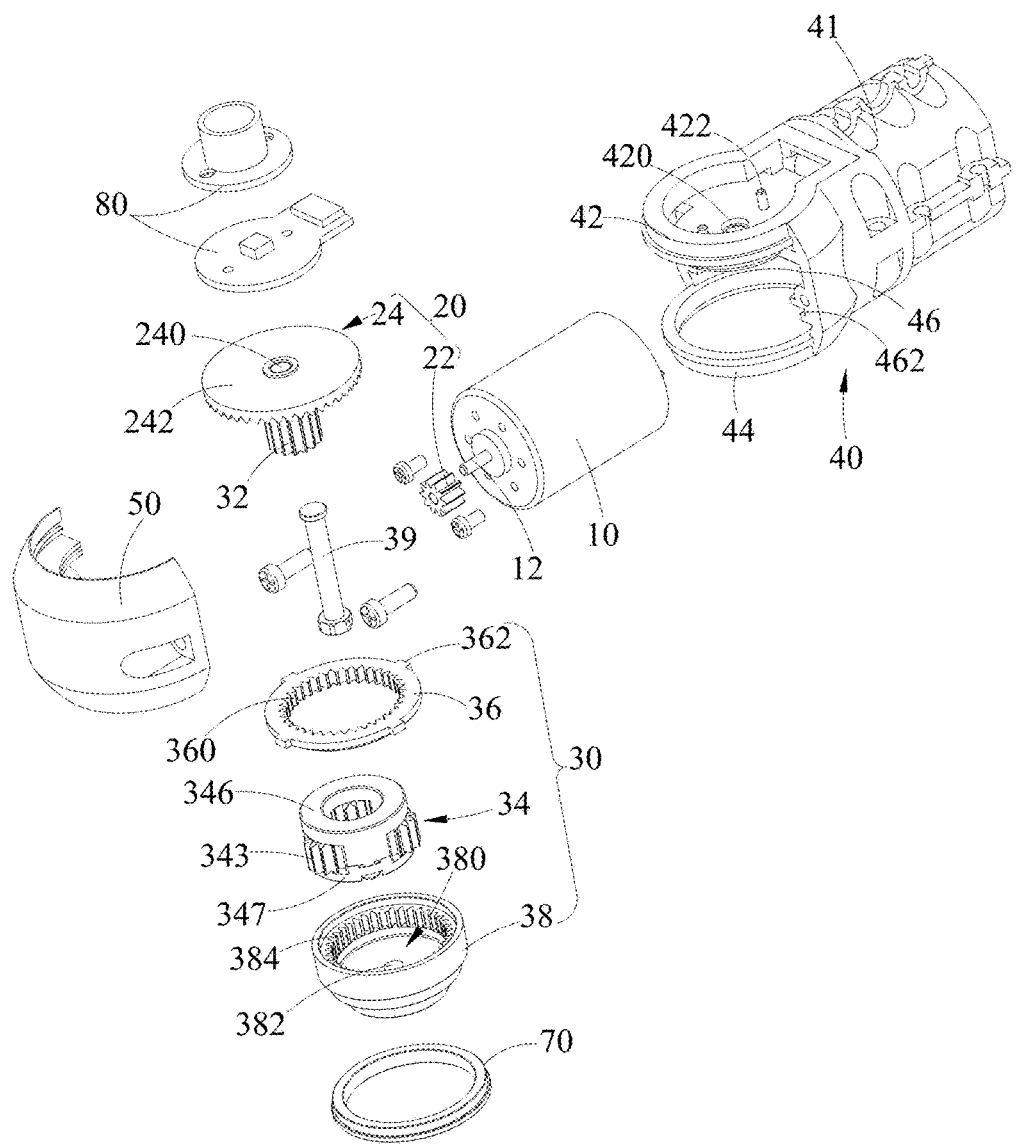
FIG. 3 is an exploded view of the speed reduction device, taken along one direction.
Figure 4:
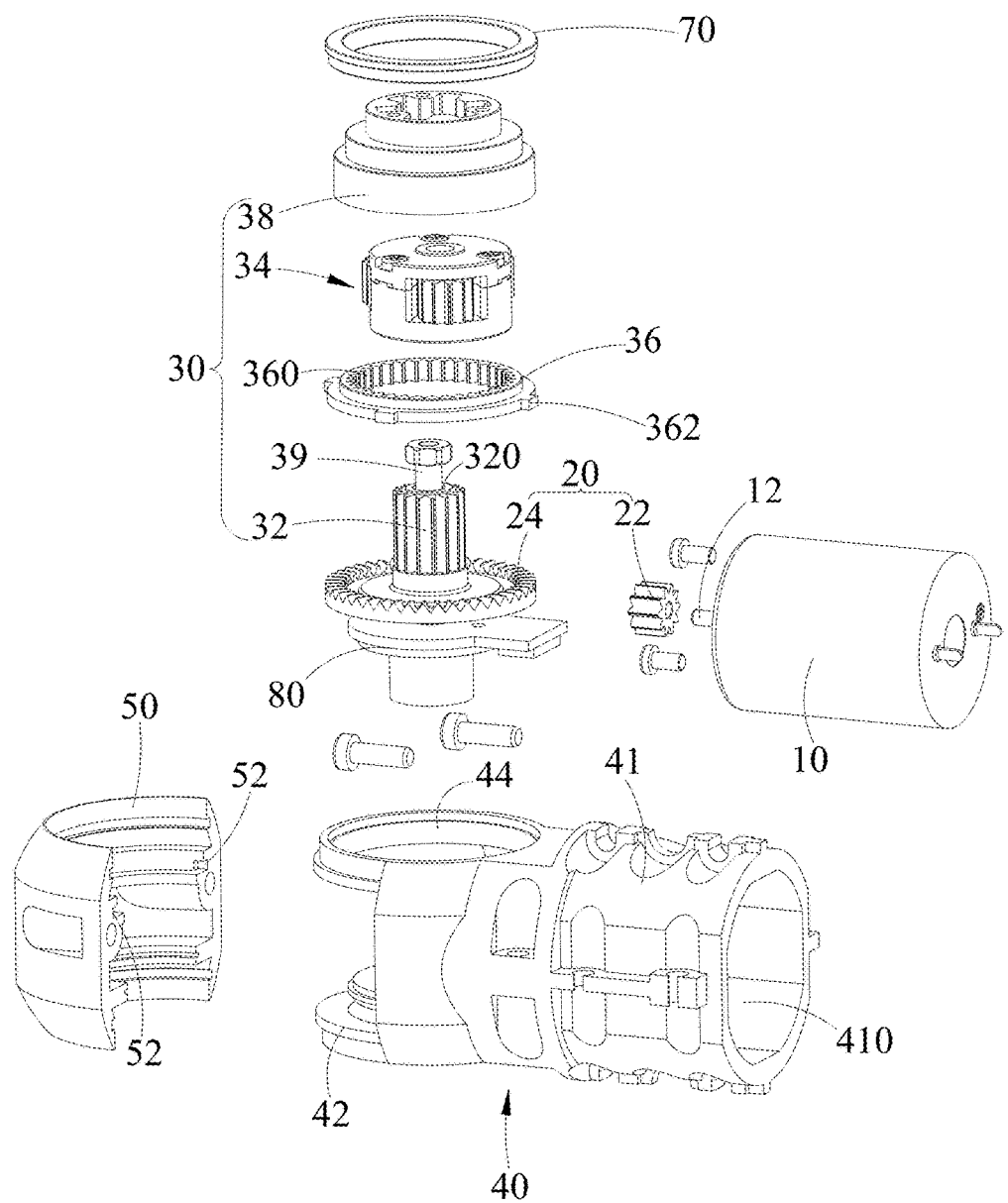
FIG. 4 is an exploded view of the speed reduction device, taken along another direction.
Figure 5:
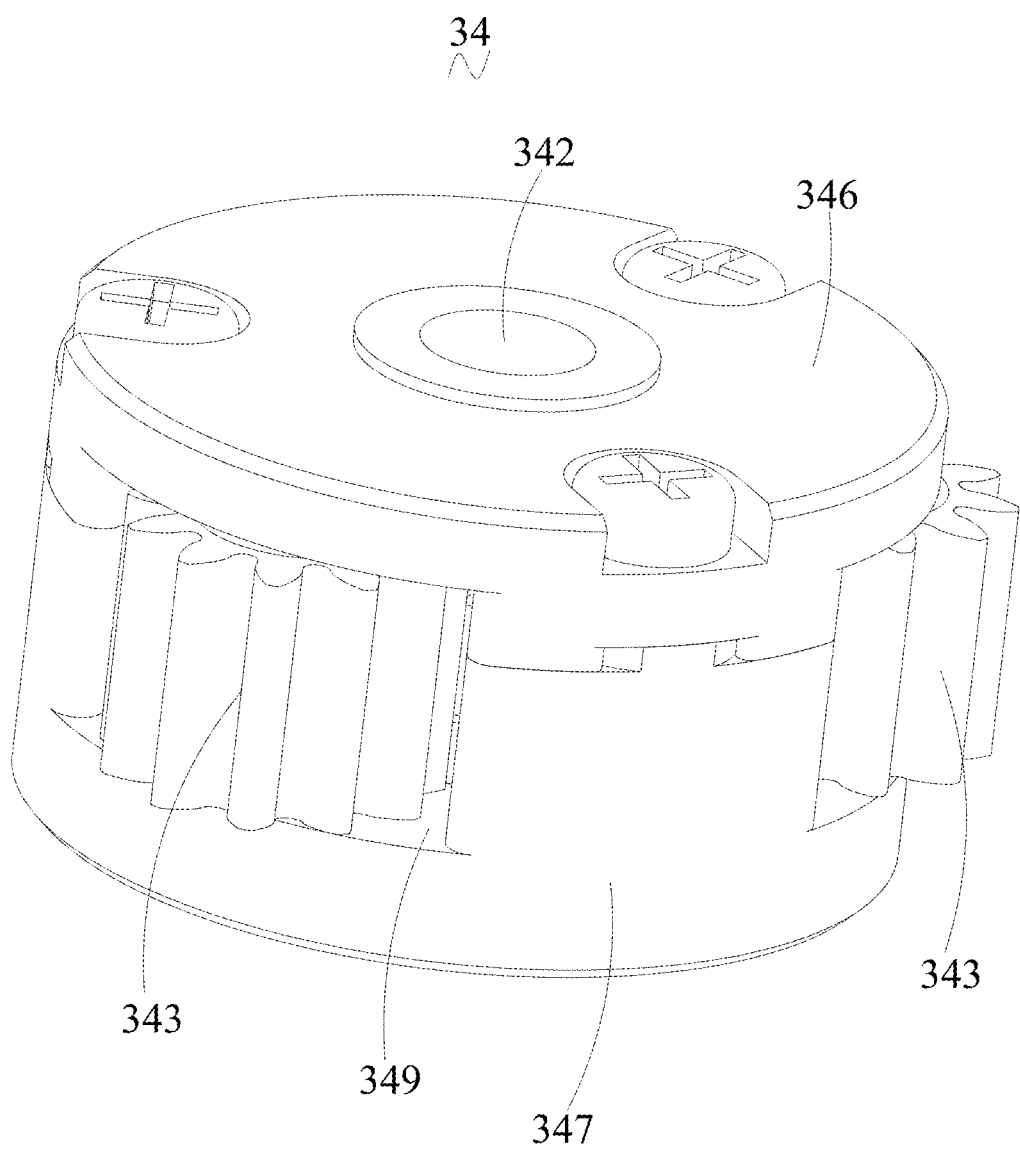
FIG. 5 is a structural view of a planet gear set of FIG. 2.
Figure 6:
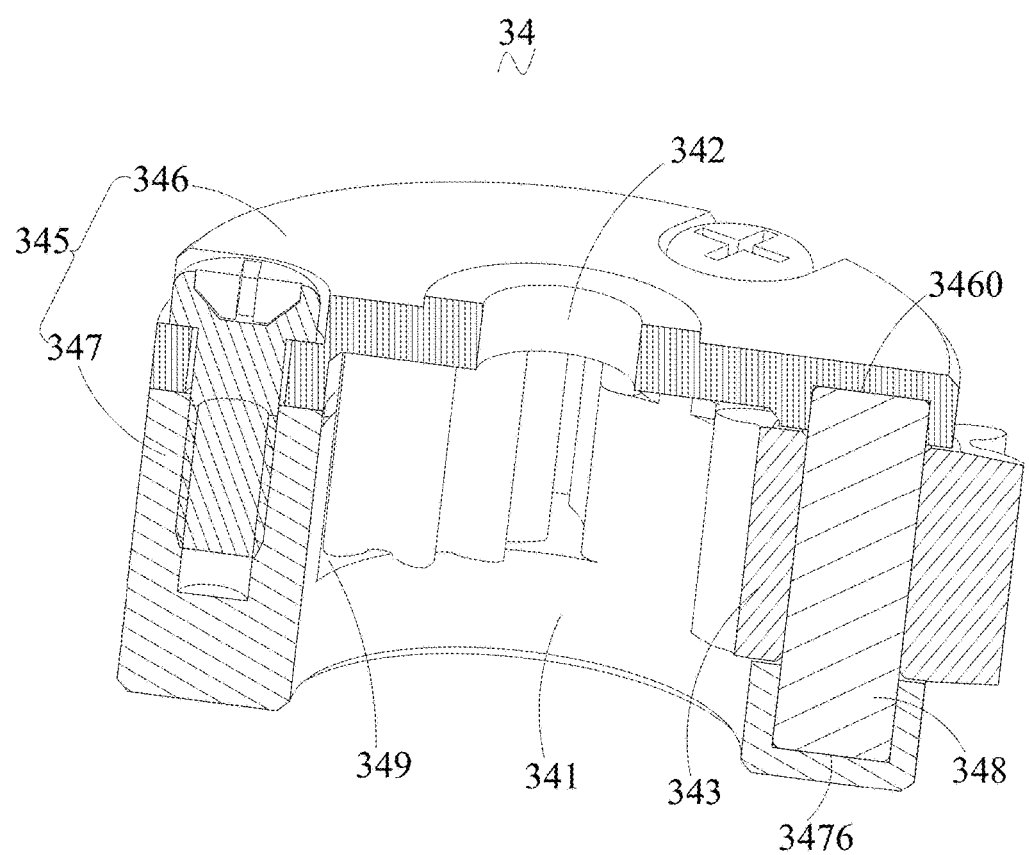
FIG. 6 is a sectional view of the planet gear set of FIG. 5.
Figure 7:
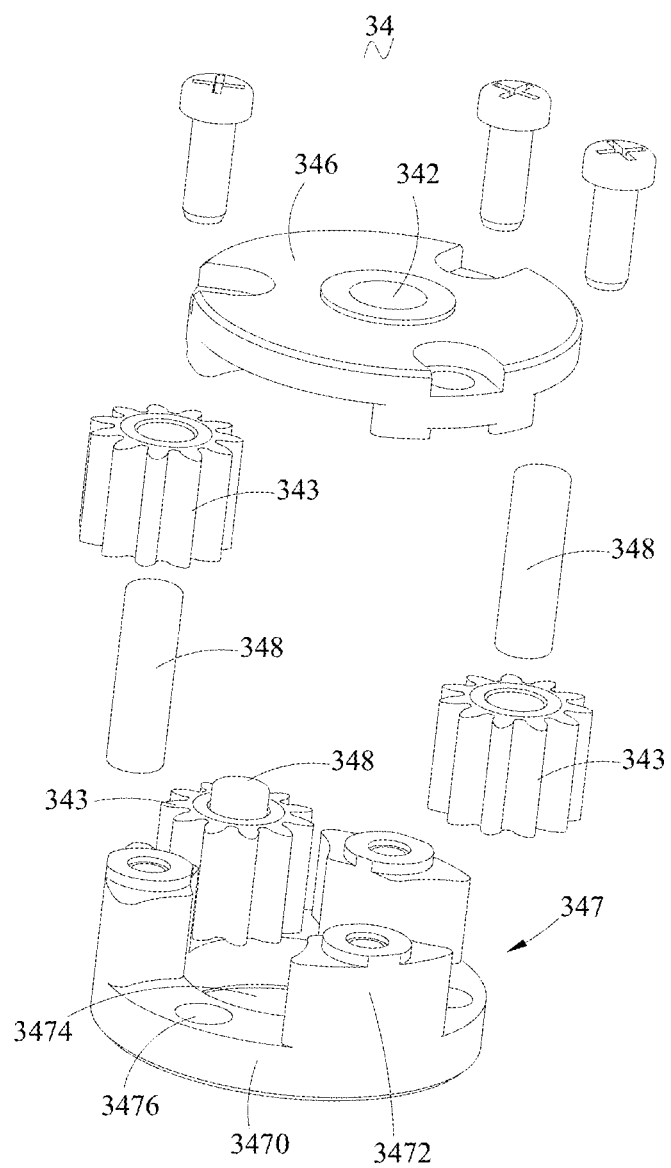
FIG. 7 is an exploded view of the planet gear set of FIG. 5, seen along one direction.
Figure 8:
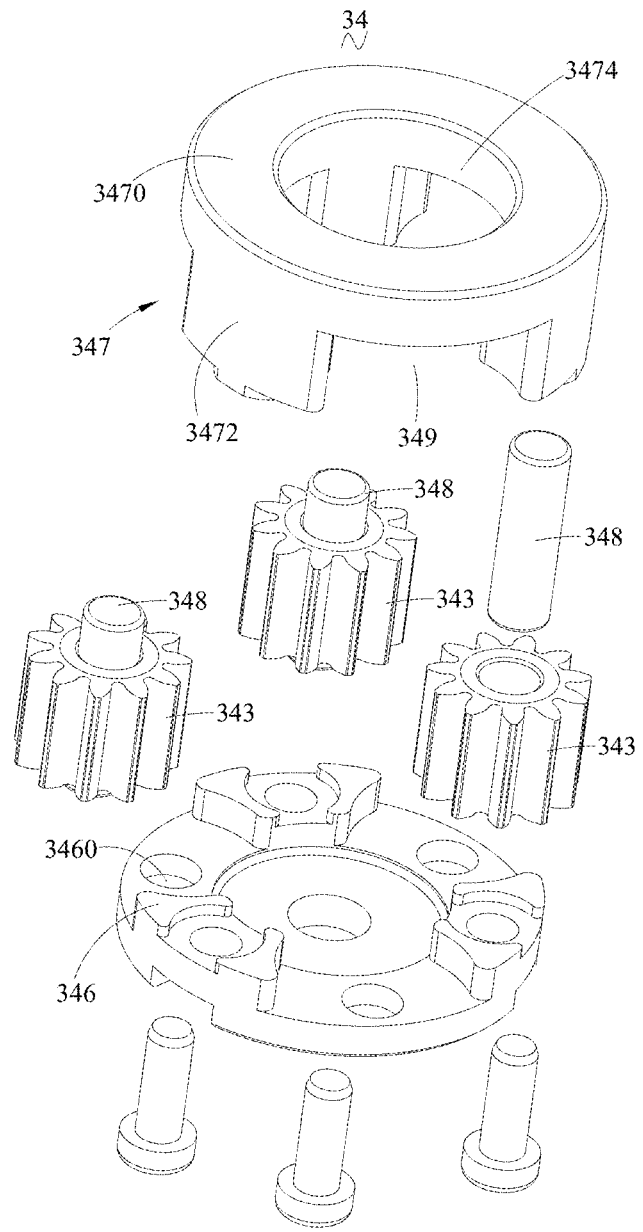
FIG. 8 is an exploded view of the planet gear set of FIG. 5, seen along another direction.

| | | | |
|---|---|---|---|
| 10 | DRIVING DEVICE | 30 | SECOND STAGE SPEED REDUCTION ASSEMBLY |
| 12 | OUTPUT SHAFT | 32 | SUN GEAR |
| 20 | FIRST STAGE SPEED REDUCTION ASSEMBLY | 320 | SECOND THROUGH HOLE |
| 22 | POWER GEAR | 34 | PLANET GEAR SET |
| 24 | FACE GEAR | 341 | RECEIVING GROOVE |
| 240 | FIRST THROUGH HOLE | 342 | THIRD THROUGH HOLE |
| 242 | DISC FACE PORTION | 343 | PLANET GEAR |
| | | 345 | CARRIER |
| 41 | BASE | 346 | UPPER PANEL |
| 41 | MAIN BODY | 3460 | SECOND MOUNTING SLOT |
| 410 | FIRST RECEIVING CHAMBER | 347 | LOWER PANEL |
| 42 | SUPPORT | 3470 | BASE |
| 420 | FIXING HOLE | 3472 | PROTRUDING POST |
| 422 | POSITIONING POST | 3474 | THROUGH HOLE |
| 44 | RING PORTION | 3476 | FIRST MOUNTING SLOT |
| 46 | FIXING INNER SIDE | 348 | PLANET AXLE |
| | | 349 | MOUNTING OPENING |
| 462 | FIRST FIXING GROOVE | 36 | FIXED GEAR |
| 50 | SIDE COVER | 360 | FIRST INNER GEAR TEETH |
| 52 | SECOND FIXING GROOVE | 362 | FIXING BLOCK |
| 60 | SECOND RECEIVING CHAMBER | 38 | OUTPUT GEAR |
| | | 380 | RECEIVING CHAMBER |
| 70 | POSITIONING RING | 382 | FOURTH THROUGH HOLE |
| | | 384 | SECOND INNER GEAR TEETH |
| 80 | END COVER | 39 | FIXED SHAFT |

In the descriptions of the present invention, it should be understood that orientations or positions denoted by the terms length, width, upper, lower, front, back, left, right, upright, horizontal, top, bottom, inner and outer are based on the orientations or positions shown in the drawings, are used for the ease of describing the present invention and simplifying descriptions, and are not to denote or imply that the denoted device(s) or element(s) necessarily has specific orientations and are constructed and operated in specific orientations. The terms are thus not to be construed as limiting the present invention.

In addition, the terms first and second are merely used for descriptive purpose and are not to be construed as denoting or implying relative importance or implying the amount of the denoted technical features. Thus, the feature(s) defined by terms first and/or second may explicitly or implicitly include one or more the features. In the descriptions of the present invention, the term plurality means two or more unless otherwise explicitly defined.

In the present invention, unless otherwise explicitly defined and limited, the terms mount, connect, join and fix should be broadly understood. For example, they may refer to a fixed connection, a detachable connection or an integrally formation. They may refer to a mechanical connection or an electrical connection. They may refer to a direct connection or an indirect connection via an intermediate medium. They may refer to a communication of the interiors of two elements or an interaction relationship. To those having ordinary skill in the art, the meaning of the aforementioned terms in the present invention may be understood according to specific circumstances.

DETAILED DESCRIPTION

The embodiment(s) of the present invention will be described in detail. The examples of the embodiment(s) are shown in the drawings, throughout which the same or similar reference numerals denote the same or similar elements or elements having the same or similar functions. The following embodiments described by making reference to the drawings are exemplary, aim to explain the present invention, and are not to be construed as limiting the present invention.

In order to make object, technical solution and advantages of the present invention more clear, the present invention will be further described in detail in conjunction with embodiments and the drawings.

Referring to FIGS. 1-8, a speed reduction device provided by an embodiment of the present invention includes:

a driving device 10 used to provide power and including an output shaft 12 for outputting power;

a first stage speed reduction assembly 20 used to change an output direction of the power, the first stage speed reduction assembly 20 including a power gear 22 that is mounted on the output shaft 12 and rotates together with the output shaft 12, and a face gear 24 that engages the power gear 22, and a rotation direction of the face gear 24 being perpendicular to a rotation direction of the power gear 22; and a second stage speed reduction assembly 30 securely mounted on a surface of the face gear 24 that has gear teeth, and including a sun gear 32 that rotates coaxially with the face gear 24, a planet gear set 34 that engages the sun gear 32 and is driven to rotate by the sun gear 32, a fixed gear 36 that is mutually engaged with the planet gear set 34 and used to restrict idling of the planet gear set 34, an output gear 38 that is mutually engaged with the planet gear set 34 and outputs the power, and a fixed shaft 39 that passes through the face gear 24, the sun gear 32 and the planet gear set 34 in sequence and is locked tightly to the output gear 38.

The speed reduction device provided by the embodiment of the present invention utilizes the first stage speed reduction assembly 20 and the second stage speed reduction assembly 30 for power transmission, which has a compact structure and a higher single transmission ratio. Specifically, the speed reduction device arranges the power gear 22 to engage the face gear 24 in the first stage speed reduction assembly 20 to drive the face gear 24 to rotate and realize the change of the direction of power transmission. The speed reduction device makes the sun gear 32 to rotate together with the face gear 24, and uses the sun gear 32 to drive the planet gear set to drive the output gear 38 to rotate, thereby realizing power transmission, a compact structure and a small size. Fewer gears are used, thereby effectively ensuring the consistency of the gears during manufacturing, test and assembling.

In the embodiment, the gear teeth of the face gear 24 are circumferentially distributed and face the planet gear set 34. It can be understood that the axial direction of the power gear 22 is perpendicular to that of the face gear 24, thereby causing the direction of the power outputted by the output shaft 12 to be changed. The face gear 24 includes a disc face portion 242 that defines a first through hole 240. The gear teeth of the face gear 24 are circumferentially distributed on an upper surface of the disc face portion 242. The fixed shaft 39 passes through the first through hole 240 to mage with the sun gear 32 and the planet gear set 34.

In the embodiment, the sun gear 32 protrudes and extends from the upper surface of the disc face portion 242, and is provided with outer teeth that engage the planet gear set 34. It can be understood that the sun gear 32 protrudes and extends from the disc face portion 242 and is provided with a second through hole 320 that communicates with the first through hole 240 for the penetrating of the fixed shaft 39. The outer teeth of the sun gear 32 are mutually engaged with the planet gear set 34 to drive the planet gear set 34 to rotate. Preferably, the outer teeth of the sun gear 32 are distributed along an axial direction of the sun gear 32.

In the embodiment, the sun gear 32 and the face gear 24 are integrally formed. The sun gear 32 rotates as the face gear 24 rotates and has the same rotational speed.

In the embodiment, the planet gear set 34 is provided with a receiving groove 341 for receiving the sun gear 32, and a third through hole 342 that allows the fixed shaft 39 to pass therethrough. The third through hole 342 communicates with and coaxial with the receiving groove 341. The third through hole 342, the first through hole 240 and the second through hole 320 communicate with each other, which allows the fixed shaft 39 to pass therethrough. The output gear 38 is provided with a receiving chamber 380 for receiving the planet gear set 34, and a fourth through hole 382, in a bottom of the receiving chamber 380, that allows the fixed shaft 38 to pass therethrough. The output gear 38 is provided with inner gear teeth facing the planet gear set 34.

In the embodiment, the fixed shaft 39 passes through the first through hole 240, the second through hole 320, the third through hole 342 and the fourth through hole 382 in sequence, and is tightly locked via a nut at a side adjacent to the output gear 38.

Referring to FIGS. 3-8, further, the planet gear set 34 includes three planet gears 343 that are arranged at an outside of the sun gear 32 and engage the sun gear 32, and a planet carrier 345 that is used to mount the planet gears 343 thereon and is mounted to the fixed shaft 39. The output gear 38 is arranged around a periphery of the planet gears 343 and engages the planet gears 343. The planet carrier 345 is fixed to the fixed shaft 39. The planet gears 343 engage the sun gear 32 and rotate with respect to the planet carrier 345, thereby driving the output gear 38 to rotate. It can be understood that the planet carrier 345 is provided with the third through hole 342 and defines the receiving chamber 380. The sun gear 32 is received in the receiving chamber 380. The outer teeth of the sun gear 32 is mutually engaged with the outer teeth of the planet gears 343, to drive the planet gears 343 to rotate with respect to the planet carrier 345. The outer teeth of the planet gears 343 engage the inner gear teeth of the output gear 38, and drive the output gear 38 to rotate.

The speed reduction device makes power to be split by arranging three planet gears 343 in the planet gear set 34 and using the three gears 343 to simultaneously transfer load. In this way, the speed reduction device has a high load bearing capability.

In the embodiment, since the second stage speed reduction assembly 30 uses NGWN type planet gear transmission, the speed reduction device has a higher single stage speed reduction ratio. Thus, the whole speed reduction device can satisfy the requirement of total speed reduction with only the first stage speed reduction assembly 20 and the second speed reduction device 30. Furthermore, because of using NGWN type planet gears, the amount of gears used by the speed reduction device decreases dramatically, reducing the steps of assembling the speed reduction device and saving cost. Because of using NGWN type planet gears, the second stage speed reduction assembly 30 is compact in structure and has high load bearing capability.

In the embodiment, the driving device can be a driving motor. Different type of driving motor can be selected according to the actual required output power.

Referring to FIGS. 5-8, further, the fixed gear 36 is provided with first inner gear teeth 360 that engage the planet gears 343. The output gear 38 is provided with second inner gear teeth 384 that engage the planet gears 343. The first inner gear teeth 360 and the second inner gear teeth 384 are arranged along an axial direction of the planet gears 343 and stacked on each other. It can be understood that the first inner gear teeth 360 and the second inner gear teeth 384 are simultaneously engaged with the planet gears 343. The first inner gear teeth 360 and the second inner gear teeth 384 are arranged along an axial direction of the planet gears 343 and stacked on each other. The first inner gear teeth 360 is arranged between the second inner gear teeth 384 and the face gear 24. The first inner gear teeth 360 of the fixed gear 36 engage the outer teeth of the planet gears 343, to prevent the planet gears 343 from idling, thereby ensuring the normal operation of the planet gears 343.

In the embodiment, the difference between the number of teeth of the first inner teeth 360 and the number of teeth of the second inner teeth 384 is an integral multiple of the number of the planet gears 343. For example, the difference may be 3, 6 or 9, and may be other values, which are not listed here one by one. The assembling condition of the fixed gear 36, the output gear 38 and the planet gears 343 are satisfied by the difference in the number of teeth between the first inner gear teeth 360 and the second inner gear teeth 384. Preferably, the difference in the number of teeth between the first inner gear teeth 360 and the second inner gear teeth 384 is three, that is, the number of the planet gears 343. The planet gears 343 and each of the fixed gear 36 and the output gear 38 form angular modification gear transmission so as to realize equal engagement center distance and outputting power via the output gear 38.

Referring to FIGS. 5-8, further, the planet carrier 345 includes an upper panel 346 mounted to the fixed shaft 39, a lower panel 347 fixed to the upper panel 346 and a plurality of planet axles 348 that are securely connected to the planet gears 343. The upper panel 246 and the lower panel 347 define therebetween a plurality of mounting openings 349 for mounting the planet gears 343 therein. The axles 348 are arranged in the mounting openings 349 and each include an end inserted into the upper panel 346 and an opposite end inserted into the lower panel 347. It realizes the mounting of the planet gears 343 by arranging the upper panel 346 and the lower panel 347, which is compact in structure and ease of assembling/disassembling.

During assembling, each planet axle 348 is inserted into a corresponding planet gear 343 and is securely mated with the planet gear 343, and one end of the axle 348 is inserted into the lower panel 347. The upper panel 346 is arranged opposite to the lower panel 347 and the other end of the axle 348 is inserted into the upper panel 346. The upper panel 346 and the lower panel 347 are fixed together by fastening screws, thereby mounting the planet axles 348 and the planet gears 343 in the mounting openings 349. The planet gears 343 rotate with respect to the upper panel 346 and the lower panel 347 under engagement of the sun gear 32.

Referring to FIGS. 5-8, in the embodiment, the lower panel 347 includes a base 3470 and a plurality of protruding posts 3472 protruding and extending from a surface of the base 3470 toward the upper panel 346. The protruding posts 3472 are arranged to be spaced from each other, and one planet gear 343 is mounted between two adjacent protruding posts 3472. The base 3470 is provided with a through hole 3474 that allows the sun gear 32 to pass therethrough, and a first mounting slot 3476 between two adjacent protruding posts 3472. One end of one planet axle 348 is inserted into the mounting slot 3476. The upper panel 346 defines second mounting slots 3460 opposite to the first mounting slots 3476. The other end of the planet axle 348 is inserted into one second mounting slot 3460. The upper panel 346 is arranged opposite to the lower panel 347 and the first mounting slots 3476 are aligned with the second mounting holes 3460, fastening screws are used to pass through the upper panel 346 and securely locked in the protruding posts 3472 of the lower panel 347. In this way, two adjacent protruding posts 3472 and the upper panel 346 define cooperatively one mounting opening 349, in which one planet gear 343 is mounted. The base 3470, the protruding posts 3472 and the upper panel 346 define cooperatively the receiving chamber 380 that receives the sun gear 32. The receiving chamber 380 communicates with the mounting openings 349. The sun gear 32 is received in the receiving chamber 380 and engages the planet gears 343 mounted in the mounting openings 349 so as to drive the planet gears 343 to rotate with respect to the upper panel 346 and the lower panel 347 and drive the output gear 38 to rotate to transfer power. In the embodiment, the two ends of each planet axle 348 are mounted in the first mounting slots 3476 and the second mounting slots 3460 via bearings, so as to allow the planet gears 343 to be rotatable with respect to the upper panel 346 and the lower panel 347.

In the embodiment, the planet gears 343 are circumferentially distributed about the fixed shaft 39 with equal spacing. It can evenly transfer load and cause power to be evenly split by arranging the planet gears 343 with equal spacing.

Referring to FIGS. 5-8, further, each planet gear 343 includes a first gear and a second gear (not shown) that are stacked on each other along its axial direction. The first gear and the second gear are rotatable with respect to the planet axles 348. It can be understood that the first gear and the second gear are fixed to each other and no relative displacement will occur between them at any time. The planet gears are duplicate gears whose structure can be integrally formed, and may also be separately formed and fixed together. The first gear and the second gear are arranged to respectively mate with the fixed gear 36 and the output gear 38, and the first gear and the second gear are fixed to the planet axles 348. Preferably, the first gear and the second gear have the same diameter and parameters such as number of gear teeth are also the same.

Referring to FIGS. 5-8, further, the first gear and the second gear are integrally formed. The fixed gear 36 and the output gear 38 simultaneously engage the integrally formed first gear and second gear.

Referring to FIGS. 1-4, further, the speed reduction device further includes a base 41 defining a first receiving chamber 410 and a side cover 50 securely connected to the base 41. The side cover 50 and the base 41 define a second receiving chamber 60. The driving device 10 is mounted within the first receiving chamber 410. The first stage speed reduction assembly 20 and the second stage speed reduction assembly 30 are mounted within the second receiving chamber 60. The fixed gear 36 is fixed to the base 41 and the side cover 50. The base 41 and the side cover 50 are arranged to form an appearance part of the speed reduction device and form the exterior casing structure of the speed reduction device, which take the role of protecting the driving device 10, the first speed reduction assembly 20 and the second speed reduction assembly 30. The periphery of the fixed gear 36 is fixed to the base 41 and the side cover 50, and received in the second receiving chamber 60.

Referring to FIGS. 1-4, further, the base 41 includes main body 41 defining the first receiving chamber 410, a support 42 protruding and extending from a bottom of the main body 41 and used to support the face gear 24. The support 42 defines a fixing hole 420, and the fixed shaft 39 is inserted into the fixing hole 420 and passes through the face gear 24. It can be understood that the fixing hole 420 communicate with the through hole 3474 and the first through hole 240 of the face gear 24. The fixed shaft 39 passes through the fixing hole 420, the through hole 3474, the first through hole 240, the second through hole 320, the third through hole 342 and the fourth through hole 382 in sequence, and protrudes out of the output gear 38 and securely locked and fixed by a fastening screw.

Referring to FIGS. 1-4, the base 41 further includes a ring portion 44 that is opposite to the support 42 and arranged around a periphery of the output gear 38, and a fixing inner side 46 that is arranged between the ring portion 44 and the support 42 and opposite to the side cover 50 for being fixed to the side cover 50. The ring portion 44 is arranged opposite to the support 42. The ring portion 44 is ring shaped and arranged around a periphery of the output gear 38, and engages the side cover 50. The fixing inner side 46 is the portion where the output shaft 12 of the driving device 10 protrudes. The fixing inner side 46 is provided with a through hole communicating with the first receiving chamber 410 and the second receiving chamber 60. The output shaft 12 and the power gear 22 mounted on the output shaft 12 pass through the through hole along the first receiving chamber 410 and mate with the face gear 24 in the second receiving chamber 60.

In the embodiment, the main body 41, the support 42 and the ring portion 44 are integrally formed.

In the embodiment, the periphery of the fixed gear 36 is fixed to the side cover 50 and the fixing inner side 46. In the embodiment, the fixing inner side 46 is provided with a first fixing groove 462 for fixing the fixed gear 36. The side cover 50 is provided with a second fixing groove 52 opposite to the first fixing groove 462. The outer periphery of the fixed gear 36 is provided with a plurality of fixing blocks 362. The fixing blocks 362 are received in the first fixing groove 462 and the second fixing groove 52 so as to realize fixed connection. The side cover 50 is provided with a first positioning groove and a second positioning groove (not shown) in an inner side for engaging the main body 41 and the ring portion 44. The first positioning groove and the second positioning groove are located at opposite sides of the second fixing groove 52. Preferably, the number of the fixing blocks 362 is four, and the fixing blocks 362 are distributed along the periphery of the fixing gear 36 with equal spacing.

In the embodiment, the speed reduction device further includes a positioning ring 70 that is arranged around the periphery of the output gear 38 and embedded in the ring portion 44 so as to cause the output gear 38 to be steadily mounted in the base 41 and avoid the output gear 38 to be radially deflected.

In the embodiment, the output gear 38 is provided with a stepped portion (not shown) engaged with the fixed gear 36 under the second inner gear teeth 384. One side of the fixed gear 36 is embedded in the stepped portion, and another side of the fixed gear 36 is fixed in the first fixing groove 462 and the second fixing groove 52.

In the embodiment, the speed reduction device further includes an end cover 80 mounted to a side of the support 42 that is away from the face gear 24. The support 42 is provided with a plurality of positioning posts 422 that protrude toward the end cover 80 and engage the end cover 80 so as to position the end cover 80. The end cover 80 is fixed to the support 24 by fasteners, thereby securely connecting the end cover 80 to the base 41.

In the aforementioned embodiments, the power gear 22, the face gear 24, the sun gear 32, the planet gears 343, the fixed gear 36, and the output gear 38 each has a module of 0.4. The number of teeth of the power gear 22 is 10. The number of teeth of the face gear 22 is 44. The number of teeth of the sun gear 32 is 15. The number of teeth of each planet gear 343 is 11. The number of teeth of the fixed gear 36 is 36. The number of teeth of the output gear 38 is 39. The transmission ratio of the first stage speed reduction assembly 20 is 4.4. The transmission ratio of the second stage speed reduction assembly 30 is 44.2. The transmission ratio of the speed reduction device is 194.48. In other embodiments, the module and the number of teeth of the power gear 22, the face gear 24, the sun gear 32, the planet gears 343, the fixed gear 36, and the output gear 38 may be adjusted according to the required output power, and are not limited to what has listed in the embodiment.

Figure 9:
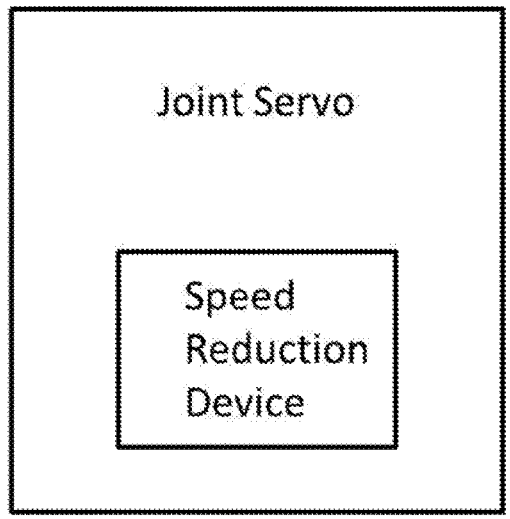
FIG. 9 is a schematic view of a joint servo according to an embodiment of the present invention.

Referring to FIG. 9, a joint servo provided by an embodiment of the present invention includes the aforementioned speed reduction device. The speed reduction device of the present embodiment has the same structure and effect as the speed reduction device of the aforementioned embodiments, and will not be repeated here.

In the embodiment, the joint servo uses the speed reduction device provided by the aforementioned embodiments. Since the speed reduction device uses the first speed reduction assembly 20 and the second speed reduction assembly 30 for power transmission, and is compact in structure and has a high single stage transmission ratio. Thus, the joint servo has a high transmission ratio.

Figure 10:
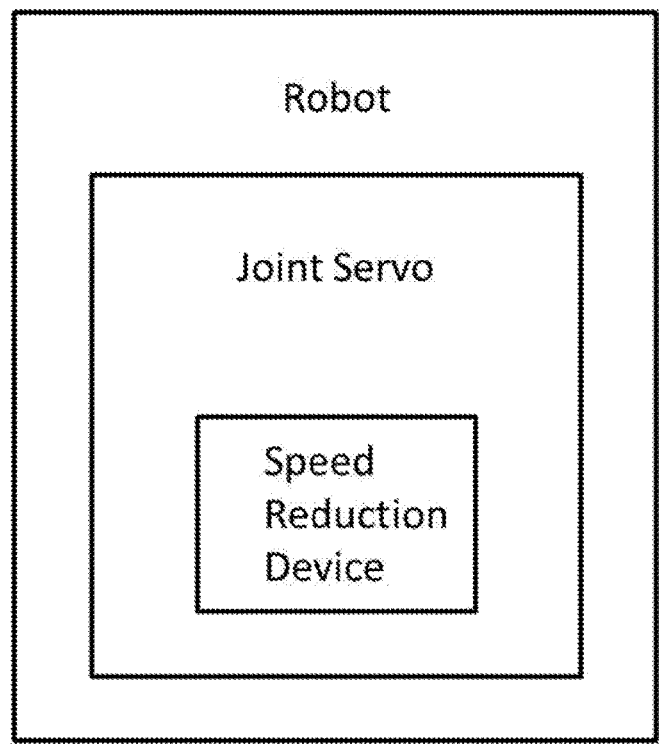
FIG. 10 is a schematic view of a robot according to an embodiment of the present invention.

Referring to FIG. 10, a robot provided by an embodiment of the present invention includes the aforementioned joint servo. The joint servo of the present embodiment has the same structure and effect as the joint servo of the aforementioned embodiment, and will not be repeated here.

The foregoing is only preferred embodiments of the present invention, and is not intended to limit the present invention. Any modifications, equivalent replacements and improvements made within the spirit and principle of the present invention should be included within the protection scope of the present invention.

What is claimed is:

1. A speed reduction device comprising:
   a driving device configured to provide power and comprising an output shaft for outputting the power;
   a first stage speed reduction assembly configured to change an output direction of the power, the first stage speed reduction assembly comprising a power gear that is mounted on the output shaft and rotates together with the output shaft, and a face gear that engages the power gear, and a rotation direction of the face gear being perpendicular to a rotation direction of the power gear, and
   a second stage speed reduction assembly securely mounted on a surface of the face gear that has gear teeth, the second stage speed reduction assembly comprising a sun gear that rotates coaxially with the face gear, a planet gear set that engages the sun gear and is driven to rotate by the sun gear, a fixed gear that is mutually engaged with the planet gear set and configured to prevent the planet gear set from idling, an output gear that is mutually engaged with the planet gear set and outputs the power, and a fixed shaft that passes through the face gear, the sun gear and the planet gear set in sequence and is fixed to the output gear.

2. The speed reduction device of claim 1, wherein the planet gear set comprises three planet gears that are arranged at an outside of the sun gear and engage the sun gear, a planet carrier that is configured to mount the three planet gears thereon and is mounted to the fixed shaft, and the output gear is arranged around a periphery of the three planet gears and engages the three planet gears.

3. The speed reduction device of claim 2, wherein the fixed gear comprises first inner gear teeth that engage the three planet gears, the output gear comprises second inner gear teeth that engage the three planet gears, and the first inner gear teeth and the second inner gear teeth are arranged along an axial direction of the three planet gears and stacked on each other.

4. The speed reduction device of claim 2, wherein the planet carrier comprises an upper panel mounted to the fixed shaft, a lower panel fixed to the upper panel and a plurality of planet axles that are securely connected to the three planet gears, the upper panel and the lower panel define therebetween a plurality of mounting openings for mounting the three planet gears therein, the plurality of planet axles are arranged in the plurality of mounting openings, and each of the plurality of planet axles comprises a respective end inserted into the upper panel and a respective opposite end inserted into the lower panel.

5. The speed reduction device of claim 4, wherein each of the three planet gears comprises a respective first gear and a respective second gear stacked on each other along a respective axial direction thereof, and the respective first gear and the respective second gear are rotatable with respect to a respective one of the plurality of planet axles.

6. The speed reduction device of any one of claims 1-5, further comprising a base defining a first receiving chamber and a side cover securely connected to the base, wherein the side cover and the base define a second receiving chamber, the driving device is mounted within the first receiving chamber, the first stage speed reduction assembly and the second stage speed reduction assembly are mounted within the second receiving chamber and the fixed gear is fixed to the base and the side cover.

7. The speed reduction device of claim 6, wherein the base comprises-a main body defining the first receiving chamber, a support protruding from a bottom of the main body and configured to support the face gear, the support defines a fixing hole, and the fixed shaft is inserted into the fixing hole and passes through the face gear.

8. The speed reduction device of claim 7, wherein the base further comprises a ring portion that is opposite to the support and arranged around a periphery of the output gear, and a fixing inner side that is arranged between the ring portion and the support and opposite to the side cover for being fixed to the side cover.

9. A joint servo comprising a speed reduction device of claim 1.

10. A robot comprising a joint servo of claim 9.

\* \* \* \* \*